March 2, 1926. 1,574,749
A. BAILEY
BACKING-OFF ATTACHMENT FOR LATHES
Filed March 25, 1922
FIG. 1
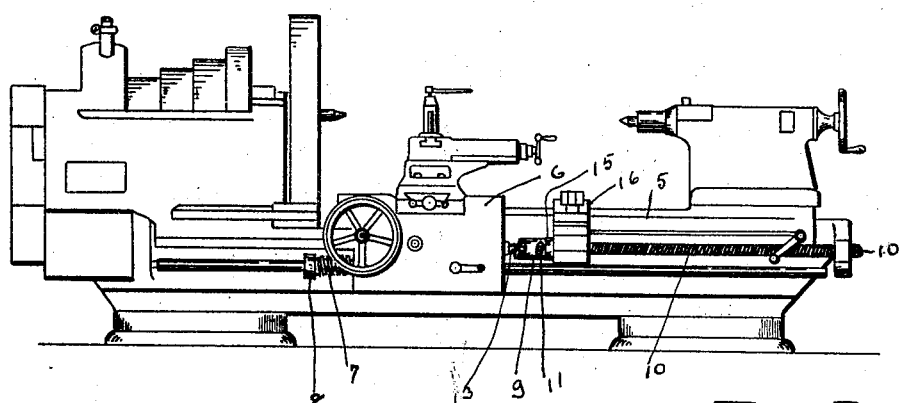
FIG. 3
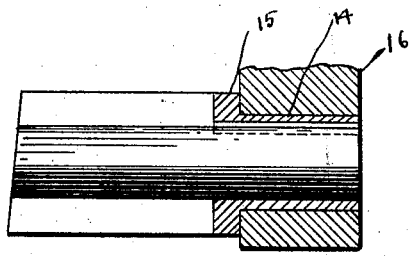
FIG. 2
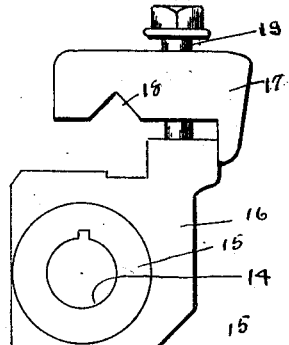
FIG. 5
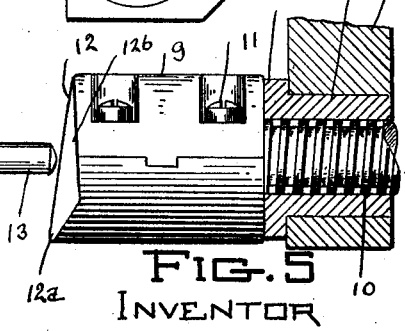
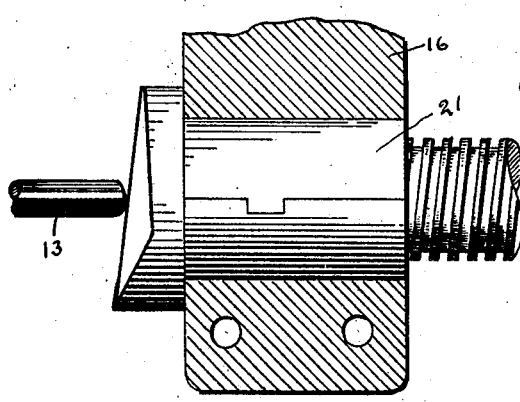
FIG. 4
INVENTOR
ALBERT BAILEY
Joseph J. O'Brien
ATTORNEY Patented Mar. 2, 1926.

1,574,749

UNITED STATES PATENT OFFICE.

ALBERT BAILEY, OF BRIGHTWOOD, MASSACHUSETTS.

BACKING-OFF ATTACHMENT FOR LATHES.

Application filed March 25, 1922. Serial No. 546,788.

*To all whom it may concern:*

Be it known that ALBERT BAILEY, a citizen of the United States of America, residing at Brightwood, in the county of Hampden and State of Massachusetts, has invented certain new and useful Improvements in Backing-Off Attachments for Lathes, of which the following in a specification.

This invention relates to improvements in lathe attachments and its leading object is to provide a lathe attachment for backing off cutters or enabling a workman to relieve a cutter, and the invention comprises a cam adapted to be engaged and rotated by the carriage feed screw and means for maintaining the carriage under tension against this cam, whereby a longitudinal movement of the carriage due to the thrust of the cam will be produced with each revolution of the screw and a relieving operation effected, the screw being capable of being driven at any gear ratio as in the usual lathe operations.

With the above and other objects in view this invention relates to certain new and useful constructions, combinations and arrangements of parts, clearly described in the following specification and fully illustrated in the accompanying drawings, in which:

Figure 1 is a side elevation of the lathe equipped with my attachment.

Figure 2 is a detail sectional view through the cam and the thrust bearing therefor.

Fig. 3 is a detail longitudinal sectional view showing the mounting of the bearing block.

Fig. 4 is a detail longitudinal sectional view of a modified form.

Fig. 5 is a similar view of the form shown in Fig. 1.

Referring to the accompanying drawings 5 designates the bed of a lathe on which the carriage 6 is arranged to move. This carriage is engaged by one or more springs 7 held in place by means of a block 8 clamped or otherwise secured to the bed 5. The spring or springs 7 are adapted to propel the carriage 6 to the right toward the cam 9 carried by the lead screw 10 which normally functions to propel the carriage 6 on the bed 5. The cam 9 is in the form of a sleeve and is provided with one or more set screws 11 which are adapted to engage the key way or key of the screw 10 whereby the cam will be held against relative rotation thereon.

The cam 9 is formed with an end cam face 12 which provides a gradual raise $12^a$ but a more rapid return $12^b$. The cam face 12 is engaged by a pin 13 carried by the carriage 6 and which pin is held normally engaged with the cam by means of the spring or springs 7. The pin or projection, as the case may be, engages the cam face 12 laterally of the axis thereof. This cam face is so designed as to produce one longitudinal movement of the carriage to the lathe with each rotation of the screw 10, and the extent of this movement will of course be governed by the design of the cam which may be varied at will. Obviously, the cam may be designed so as to produce a plurality of movements with each rotation of the screw. It is preferred, however, that the variation in the movement of the carriage relative to the lathe spindle be effected by the use of the gearing usually provided in connection with this type of lathes.

In order to prevent the action of the cam 9 producing a chattering on the carriage 6, a thrust bearing is provided which includes a bushing 14 which is provided with an end collar or head 15 which directly contacts with the left end of the cam 9. The bushing 14 extends into a bearing block 16 which is secured to the bed 5 by means of the clamping block 17 having a V-shaped groove 18 to engage the V-shaped rib of the lathe bed and which is provided with a clamping screw or the like 19 so that the blocks 16 and 17 may be clamped against the bed. The bushing 14 of the block 16 is made relatively wide and heavy so as to provide a rigid keyway whereby the bushing and the screw may be locked together by the key 10; the bushing and the collar or head 15 having a free rotary movement on the block 16. I have found that this provision effectively prevents chattering of the work due to the frictional contact of the projection or pin 13 with the cam face 12. The head 15 has a bearing against the block 16 so that said block will transmit to the bed 5 the end thrust produced on the screw 10.

Having described my invention, I claim:

1. The combination with a lathe having a bed, a carriage movable on the bed, a spindle and a carriage propelling screw having gear connection with the spindle of a cam having driving connection with the screw, and means carried by the carriage to engage said cam, said cam being arranged to propel the carriage in one direction, the carriage being movable in a direction parallel to the axis of the screw.

2. The combination with a lathe having a bed, a carriage movable on the bed, a spindle and a carriage propelling screw having gear connection with the spindle of a cam having driving connection with the screw, means carried by the carriage to engage said cam, said cam being arranged to propel the carriage in one direction, and means for propelling the carriage against the cam, the carriage being movable in a direction parallel to the axis of the screw.

3. A backing off attachment for lathes consisting of a cam adapted to be mounted upon the carriage propelling screw, and means for maintaining the carriage in contacting engagement with said cam whereby said cam will exert a propelling action on said carriage, the carriage being movable in a direction parallel to the axis of the screw.

4. A backing off attachment for lathes consisting of a cam adapted to be mounted upon a carriage propelling screw, a bearing block adapted to be mounted on the bed of a lathe, a bushing rotatable in said bearing block and having a thrust collar to engage the cam and rotate around the screw, means for securing said bearing block on the lathe bed, a projection for attachment to a carriage to engage said cam, said cam having its cam face located to propel a carriage on its bed, and springs attachable to a lathe form for maintaining the carriage toward said cam.

Signed by me at Springfield, Mass.

ALBERT BAILEY.